Nov. 20, 1923.

I. W. BURNS-LINDOW

RESILIENT WHEEL

Filed Nov. 14, 1922

Inventor:
Isaac William Burns-Lindow
By Knight Bros
attys

Nov. 20, 1923.

I. W. BURNS-LINDOW

RESILIENT WHEEL

Filed Nov. 14, 1922

Patented Nov. 20, 1923.

1,474,926

UNITED STATES PATENT OFFICE.

ISAAC WILLIAM BURNS-LINDOW, OF SELKIRK, SCOTLAND.

RESILIENT WHEEL.

Application filed November 14, 1922. Serial No. 600,953.

*To all whom it may concern:*

Be it known that I, ISAAC WILLIAM BURNS-LINDOW, a subject of the King of the United Kingdom of Great Britain and Ireland, and resident of The Yair, Selkirk, Scotland, have invented certain new and useful Improvements in Resilient Wheels, of which the following is a specification.

This invention relates to resilient wheels for vehicles of the kind in which a wheel hub carries a plurality of housings for rubber rings, the centres of which are annularly disposed around the hub centre, and in which the rings are each supported centrally on elements or bolts fixed to an outer annular tire-supporting member, a rubber buffer concentric with the hub being interposed between the latter and the outer member.

The present invention has for its object to provide a resilient wheel of this character which is of improved and simple construction and to this end the invention consists in the construction, combination and arrangement of parts hereinafter described with reference to the accompanying drawings whereon:—

Figure 3:
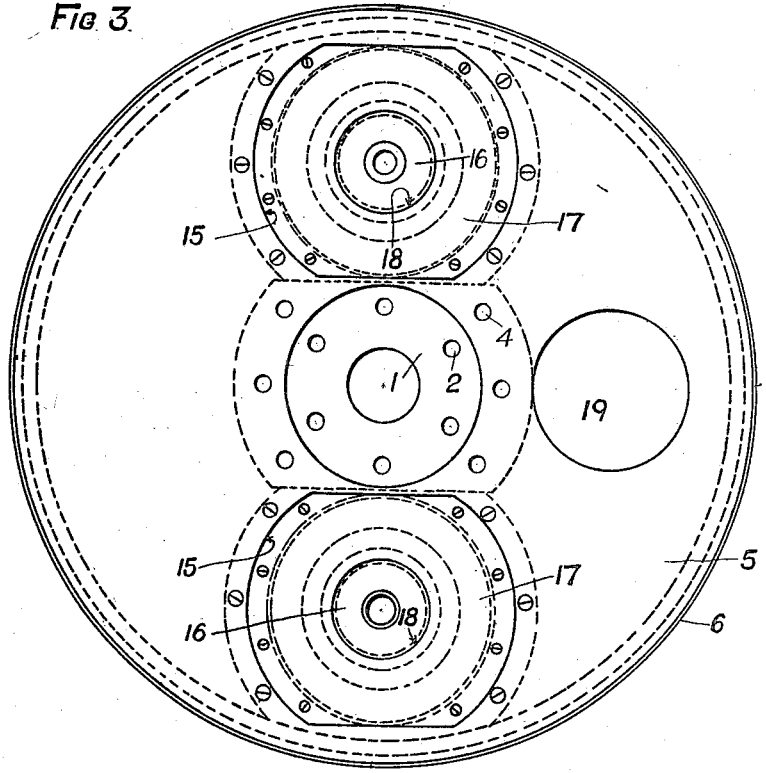
Fig. 3 is a side view with the outer discs removed.
Figure 4:
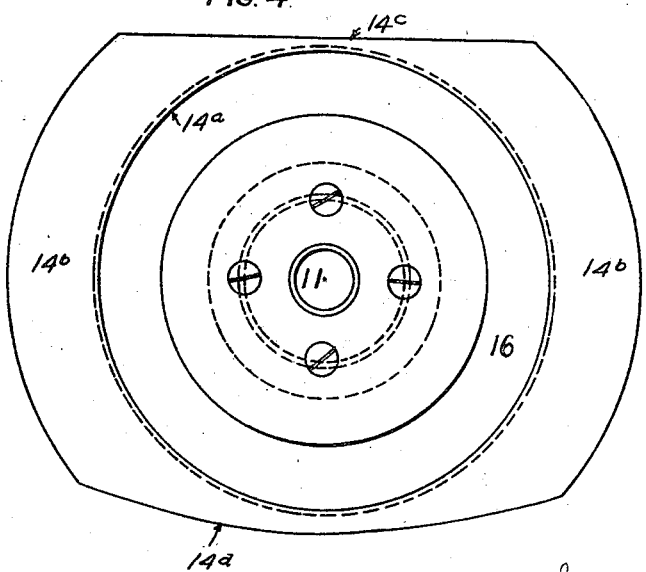
Figs. 4 and 5 are side and cross-sectional views respectively of one of the buffers and driving connection between the hub and wheel body.
Figure 5:
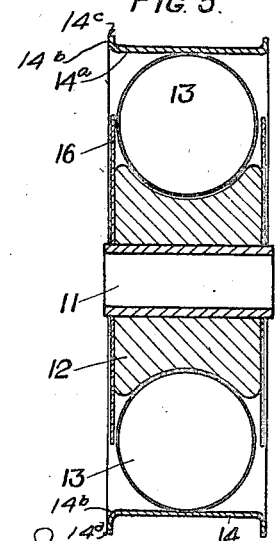

The wheel comprises a hub 1 which may be bolted to a flange or boss on the wheel axle by means of bolts passed through bolt holes 2. Secured to the hub 1 by bolts or rivets 4 is a pair of side discs 5 forming a hollow wheel body which supports a rim 6 concentric with the hub 1 and secured to the discs 5. A concentric pneumatic tube or ring 7 is fitted between the rim 6 and an outer rigid ring 8 carrying the wheel tread or tire 9, the ring 8 being supported by outer discs 10. Driving connection between the hub 1 and discs 10 is established by a plurality of driving pins 11 passing through the discs 10, each pin 11 supporting a boss 12 on which is carried a small pneumatic ring or rubber buffer 13 which is enclosed in a casing 14 secured between the discs 5. The casing 14 (as shown in Figs. 4 and 5) consists of a cylindrical body portion $14^a$ having a pair of side flanges $14^b$. The flanges $14^b$ are cut-away at $14^c$ to fit a flat on the boss 1 (as seen in Fig. 3) and are cut-away at $14^d$ to fit the curvature of the rim 6. The discs 5 are formed with apertures 15 to enable the buffers 13 to be inserted, after removing flanges 16 secured to the bosses 12, said apertures 15 being filled by cover plates 17 bolted to the casings 14 and having central clearance apertures 18 therein to allow the pins 11 sufficient movement in the apertures 18.

When the hub 1 is rotated by a driving axle, the discs 5, rim 6 and buffer casings 14 rotate with the hub, but the pins 11 carrying the bosses 12 and buffers 13 have limited movement within the discs 5. The casings 14 press against the buffers 13 and cause the bosses 12 to be carried round therewith, the buffers 13 absorbing any shock. The bosses 12 carry the pins 11 which thus drive the outer discs 10 carrying the tread 9. Should the wheel be mounted on an idle axle, it will be understood that the converse effect will take place.

Road shocks are absorbed by radial movement of the tread 9 and outer discs 10 against the resilient action of the outer pneumatic ring 7, during which movement the pins 11 move radially in the apertures 18, the shock being further absorbed by compression of the buffers 13 against the buffer casings 14.

Hand-holes 19 and 20 are provided in the discs 5 and 10 to obtain access to the inflating valve of the outer pneumatic ring 7. The discs 10 also have a central aperture 21 to clear the bolts fixing the hub to the axle.

Figure 1:
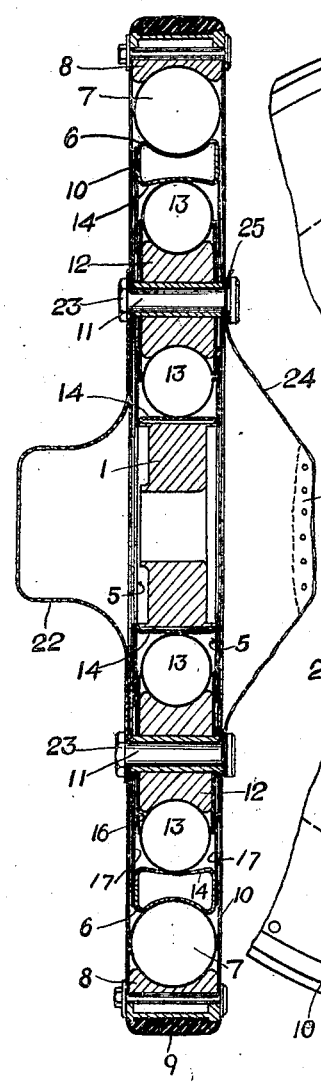
Fig. 1 is a section through the wheel taken on line 1—1 of Fig. 2.
Figure 2:
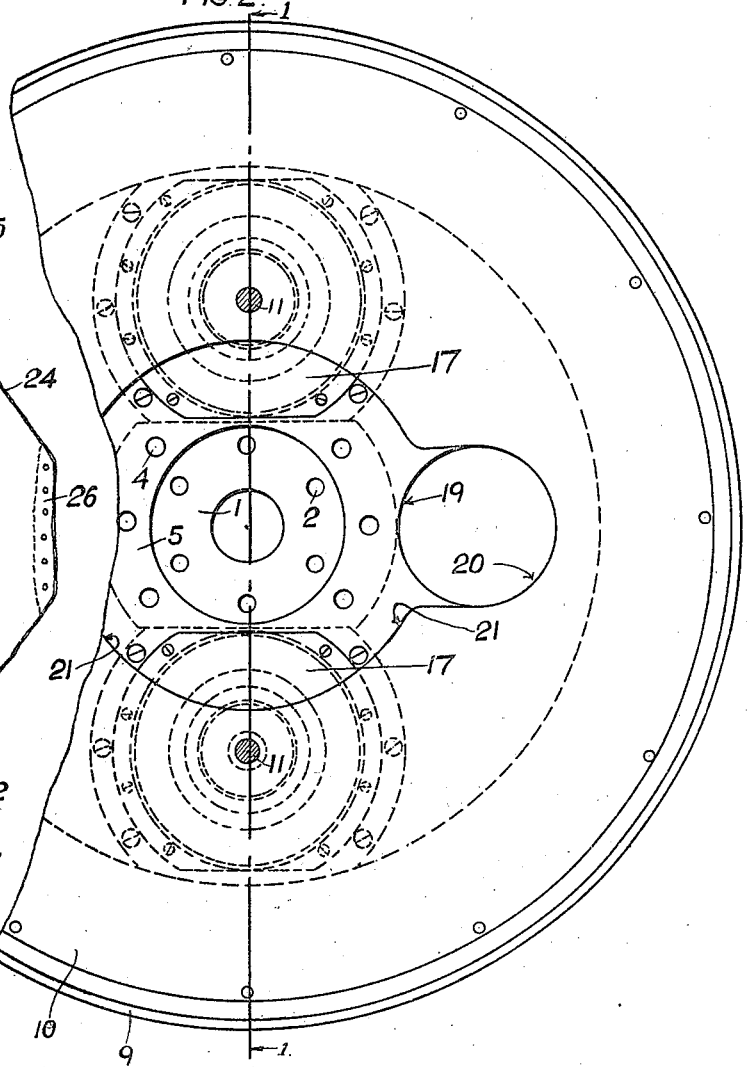
Fig. 2 is a fragmentary side view of the wheel with the cover 22 removed.

For the purpose of preventing dirt, water or the like from entering the interior of the wheel, the outside of the wheel is preferably provided with an aluminium or other light sheet metal casing or cover 22 blocked out as shown in Fig. 1 to fit over the hub cap. The cover 22 may be attached in any convenient manner to the wheel, as for instance, to the driving pins 11, being secured thereto by the nuts 23. The inside of the wheel is preferably provided with a rubber, leather, or other flexible apron or covering 24 which may be fixed to the inner side of the wheel body in any convenient manner, preferably on the driving pins 11, a washer ring 25 being interposed between the heads of the driving pins 11 or their equivalent and the flexible apron 24. The apron 24 is provided with a central aperture to fit over the wheel axle, the edge 26 of the aperture being preferably reinforced or otherwise strengthened and the aperture in the apron 24 may be drawn tight over the wheel axle by lacing threaded through the stiffened edge 26.

The construction illustrated on the drawings is given only by way of example and may be varied without departing from the features of the appended claims:

1. A resilient wheel of the kind described comprising a hub, a pair of spaced annular members extending therefrom, a plurality of casings fixed to and between said members, annular rubber buffers enclosed in said casings, an annular rim connecting the peripheries of said members, a rubber ring surrounding said rim, an outer rigid tire-carrying felloe surrounding said ring and elements for centrally supporting said buffers, said elements being movable in apertures in said members and being fixed to said felloe.

2. A resilient wheel of the kind described comprising a hub, a pair of spaced annular flanges extending therefrom, a plurality of casings fixed to and between said members around the hub, annular rubber buffers enclosed in said casings, an annular rim connecting the peripheries of said flanges, a rubber ring surrounding said rim, an outer rigid tire-carrying felloe surrounding said ring, a pair of annular flanges extending inwardly from said felloe, elements for centrally supporting said buffers, said elements being movable in apertures in the hub flanges and means for fixing said elements to the felloe flanges.

3. A resilient wheel of the kind described comprising a hub, a pair of spaced annular discs secured thereto, an annular rim connecting the peripheries of said discs, a pneumatic tube surrounding said rim, an outer rigid ring surrounding said tube, a tire tread on said ring, a pair of spaced annular flanges extending inwardly from said ring, bolts connecting said flanges together, a bobbin on each of said bolts, a pneumatic tubular buffer on each bobbin, a casing enclosing each buffer, said casings being secured between said discs, apertures in said discs registering with said buffers, removable flanges secured to said bobbins for retaining said buffers thereon, removable cover plates for the apertures in said discs, said cover plates having clearance apertures for said bolts and external coverings extending over each side of the wheel.

The foregoing specification signed at Edinburgh, Scotland, this 31st day of October, 1922.

ISAAC WILLIAM BURNS-LINDOW.